April 18, 1967 R. H. SMITH 3,315,101
SAWTOOTH SWEEP GENERATOR WITH NEGLIGIBLE RECOVERY TIME
Filed Dec. 24, 1964
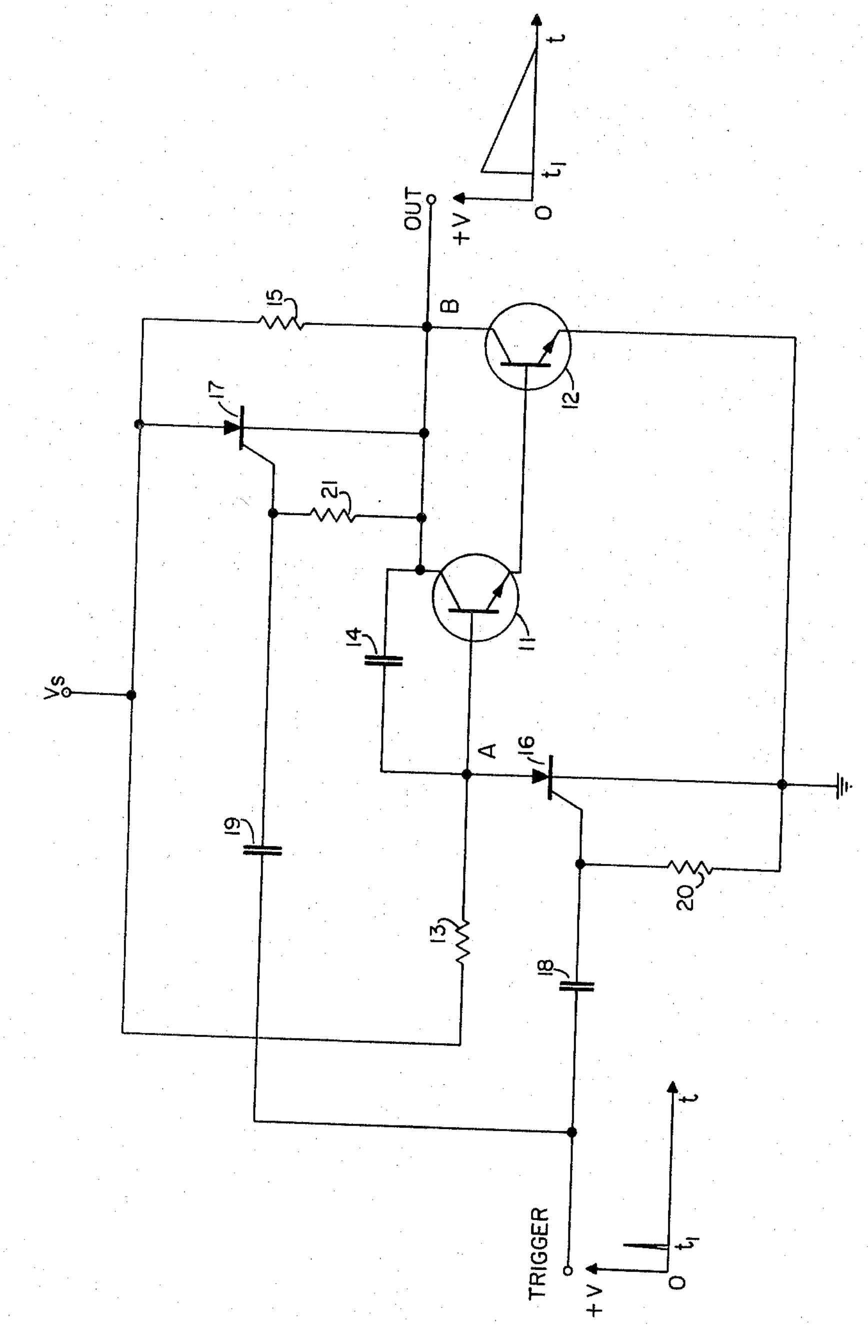
INVENTOR
RONALD H. SMITH
BY Stanley C Corwin AGENT
ATTORNEY United States Patent Office 3,315,101

Patented Apr. 18, 1967

3,315,101
SAWTOOTH SWEEP GENERATOR WITH NEGLIGIBLE RECOVERY TIME

Ronald H. Smith, Oxon Hill, Md., assignor to the United States of America as represented by the Secretary of the Navy Filed Dec. 24, 1964, Ser. No. 421,130
8 Claims. (Cl. 307—88.5)

ABSTRACT OF THE DISCLOSURE

A sawtooth sweep generator of negligible recovery time having a pair of gated rectifiers coupled in series with the capacitor of a Miller integrator to charge the capacitor when the rectifiers are triggered at a rate limited only by the response time of the rectifiers. The change of polarity caused by the charge on the capacitor itself causes the rectifiers to be triggered off in preparation for the next sweep cycle.

The invention described herein may be manufactured and used by or for the Government of the United States of America for governmental purposes without the payment of any royalties thereon or therefor.

The present invention relates to sawtooth sweep generators and more particularly to an externally triggered sawtooth sweep generator having negligible recovery time.

A problem inherent with externally triggered sawtooth generators is the appreciable percentage of the duty cycle consumed by circuit recovery time, e.g. the time expended in recharging the capacitor. Especially where long sweep periods are desired, recovery time periods in the order of 20% of the duty cycle are common and result in the inability of the circuit to be triggered at a rate permitted by the decay time of the circuit. For example, where a five second sweep is desired, as much as one second of each cycle may be required for recovery, resulting in a maximum trigger rate of one pulse every six seconds. Thus, while the sweep circuits of the prior art have generally served their purpose of sawtooth function generation, these circuits have not proved entirely satisfactory under conditions where a highly efficient duty cycle is demanded.

The general purpose of the present invention is to provide a sawtooth sweep circuit having all the advantages of such generators presently used, while eliminating the afore-described disadvantage. To achieve this, a pair of gated rectifiers are coupled in series with the capacitor of the integrating circuit of the generator to charge the capacitor when the rectifiers are triggered, at a rate limited only by the response time of the rectifiers themselves. This combination of elements is unique in that no additional circuitry is needed to turn the recovery circuit off and start the sweep. The change in polarity of the charge on the capacitor itself causes the rectifiers to be reset as an inherent function in the process of generating the sweep desired.

It is, accordingly, an object of the present invention to provide a simple sawtooth sweep generator having negligible recovery time.

Another object of the present invention is to provide a self-cycling recovery circuit for a sawtooth sweep generator.

A further object is to provide a sawtooth sweep generator capable of regularly responding to trigger pulses having a period substantially equal to the sweep period.

Other objects and advantages of the invention will become more fully apparent and better understood from the following description of a preferred embodiment of the invention, as illustrated in the accompanying drawing in which the figure illustrates an embodiment representative of the present invention.

Referring now to the figure, there is shown a pair of transistors 11 and 12 connected in tandem, the emitter of transistor 11 supplying the base current of transistor 12, while the collectors of the respective transistors are interconnected and receive bias current via load resistor 15 from a voltage source not shown which may be connected to the terminal labeled $V_s$. A capacitor 14 is connected across the amplifier formed by transistors 11 and 12, while resistor 13 supplies base current to transistor 11 and serves as an input resistor for that amplifier, being connected to the input thereof and to the bias supply terminals. Elements 11 through 15 thus constitute what is known as a Miller integrator. Since resistor 13 is quite large compared to resistor 15, the time constant of this integrator is determined by the product of the resistance of resistor 13 and the capacitance of capacitor 14, or RC, where R is the resistance of resistor 13 and C is the capacitance of capacitor 14. A pair of silicon controlled rectifiers 16 and 17 provide an alternative current path for capacitor 14, other than the path through transistors 11 and 12, coupling this capacitor directly to the bias terminal $V_s$ at one end, and ground at the other. Thus, if a bias source were to be connected positive terminal to $V_s$ and negative terminal to ground, the silicon controlled rectifiers would appear to couple the capacitor 14 in a series loop with the bias supply.

The figure shows a positive pluse being applied at the terminal labeled "trigger." This pulse is simultaneously applied to the gate electrode of each silicon controlled rectifier via the respective capacitors 18 and 19. Resistors 20 and 21 serve merely to limit the gate current of the respective silicon controlled rectifiers 16 and 17. The output of the sawtooth generator circuit, occasioned by the conduction of the two gated rectifiers, is shown at the terminal labeled "out" in this figure.

The operation of the circuit of the present invention can be readily explained if it is observed that resistors 13 and 15, capacitor 14 and transistors 11 and 12 form what is commonly known as a Miller integrator sweep circuit. A Miller integrator sweep circuit uses a square wave or step function input to produce a sawtooth output. Thus, if normally conducting transistors 11 and 12 were to be suddenly turned off, the response at the output terminal would be such as is shown, a sudden rise in the voltage to supply potential followed by a linear decrease of output voltage with the decay of the charge on capacitor 14. The effect of a square wave or step function input to the Miller integrator can be readily occasioned by instantaneously reversing the charge on capacitor 14 from the charge condition existing during normal conduction of this integrator. If the circuit has been idle for a long period of time compared with the RC time constant, point A will be near supply potential, $V_s$, and point B near ground potential. This is readily seen due to the normal conduction of the transistor amplifier of the integrator resulting in a voltage as shown prior to time $t_1$. Prior to time $t_1$ a plus charge will appear on that plate of capacitor 14 connected to the anode of silicon control rectifier 16 and that plate of this capacitor connected to the cathode of the silicon controlled rectifier 17 will be near ground potential. The silicon controlled rectifiers are thus in condition for firing. Accordingly, at any time $t_1$, if a positive pulse is applied to the respective gate electrodes of the silicon controlled rectifiers, these devices will conduct and capacitor 14 will be placed directly across the power supply $V_s$ and will immediately be charged in reverse of the quiescent charge condition previously described. With a positive potential, substantially that of the supply potential $V_s$, at point B and point A being substantially at ground potential, transistors 11 and 12 are cut off as are the now reversed biased silicon controlled rectifiers 16 and 17. As the charge on capacitor 14 is allowed to decay, the quiescent condition and normal conduction of transistors 11 and 12 is resumed. Thus, the instantaneous reverse charging of capacitor 14 has the same effect as applying a square wave to the Miller integrator portion of the circuit.

Alternative structure and changes consistent with the situations presented is within the purview of the present invention. The circuit shown in the figure of the drawing and heretofore described is thus but the preferred embodiment of the present invention and is intended to be taken by way of description and not in limitation of the general principles embodied. The broad principle of operation of this invention is merely the process of instantaneously reversing the charge on the capacitor of a Miller integrator sweep circuit, such that the effect of a square wave input is provided to the circuit. Generally contemplated is the use of externally triggered switch means to suddenly charge the capacitor to a voltage of opposite polarity to the charge normally appearing on that capacitor. The unique circuitry envisioned is voltage polarity sensitive switch means to charge the capacitor so that, upon the establishment of the reverse charge on the capacitor, further conduction of the switch means is opposed by the very charge generated, thereby eliminating the need for external reset circuitry. The present invention, for example, should not be structurally limited to semiconductor elements, the silicon controlled rectifiers being readily replaceable by thyratrons, while any high gain amplifier may readily replace the transistors shown in the preferred embodiment.

A particular advantage of the present invention is the freedom to vary the time constant or sweep-time, a function of resistors 13 and 15 and the capacitor 14, without compromising the principle of instantaneous charge reversal of the capacitor of the Miller integrator. A long sweep time is thus possible with the loss of but a negligible portion of the duty cycle, i.e. the response time of the switch means used to charge the capacitor. The utilization of a trigger pulse rate substantially equal to the frequency of the sawtooth signal generated is thus realized.

Since various changes and modifications may be made in practice of the invention herein described without departing from the spirit or the scope thereof, it is intended that the foregoing description shall be taken primarily by way of illustration and not in limitation except as may be required by the appended claims.

What is claimed and desired to be secured by Letters Patent of the United States is:

1. A sawtooth generator triggered by an external source, comprising:

a pair of gated rectifiers;
a capacitor intercoupling said pair of gated rectifiers;
an amplifier having an input resistor and a load resistor;
said capacitor being in parallel connection with said amplifier;
bias means biasing said pair of gated rectifiers and said amplifier;

and connection means applying a trigger pulse from said external source to said pair of gated rectifiers, whereby said gated rectifiers are triggered into conduction causing said capacitor to be charged to near bias supply potential and of such polarity as to oppose further conduction of said gated rectifiers and said amplifier until the charge on said capacitor decays and a second pulse triggers said gated rectifiers.

2. A sawtooth generator as recited in claim 1, wherein the pulses are applied to said gated rectifiers at a rate slow compared to the time constant determined by said capacitor and said input resistor.

3. A sawtooth generator as recited in claim 1, wherein said gated rectifiers are silicon controlled rectifiers.

4. A sawtooth sweep generator triggered by an external source, comprising:

a Miller integrator including an amplifier shunted by a capacitor;
bias means;
first and second gated rectifier means coupling said capacitor across said bias means;
and coupling means simultaneously applying a trigger pulse from said external source to each of said gated rectifier means, whereby said rectifier means are caused to conduct until said capacitor is charged.

5. A sawtooth sweep generator as recited in claim 4, wherein said gated rectifier means are silicon controlled rectifiers.

6. A sawtooth sweep generator as recited in claim 4, wherein said gated rectifier means form a series loop with said capacitor and said bias means and each element of said series loop being in such polar relationship with each other that the charge applied to said capacitor by said rectifier means opposes further conduction of said rectifier means.

7. A sawtooth sweep generator as recited in claim 6, wherein said capacitor is coupled between said gated rectifier means.

8. A sawtooth sweep generator, comprising:

a Miller integrator including a capacitor in parallel with an amplifier;
a bias supply;
a pair of silicon controlled rectifiers coupling the capacitor of said Miller integrator and said bias supply in a series loop;
said bias supply charging said capacitor in a first polarity;
and trigger means triggering said silicon control rectifiers into conduction until said capacitor is charged in a second polarity, whereby the charge of said second polarity prohibits further conduction of said silicon controlled rectifiers and the charge on said capacitor is allowed to decay.

References Cited by the Examiner

UNITED STATES PATENTS

| | | | |
|---|---|---|---|
| 2,448,070 | 8/1948 | Sunstein | 328—181 |
| 3,138,764 | 6/1964 | Dalton et al. | 328—182 |

DAVID J. GALVIN, *Primary Examiner.*

ARTHUR GAUSS, *Examiner.*

S. D. MILLER, *Assistant Examiner.*